United States Patent
Ueno et al.

(10) Patent No.: US 8,868,273 B2
(45) Date of Patent: Oct. 21, 2014

(54) APPARATUS AND METHOD FOR CONTROLLING HYBRID VEHICLE

(75) Inventors: Munetoshi Ueno, Atsugi (JP); Tadashi Okuda, Hadano (JP); Noboru Kudo, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 81 days.

(21) Appl. No.: 13/810,726

(22) PCT Filed: Jul. 19, 2011

(86) PCT No.: PCT/IB2011/001678
§ 371 (c)(1),
(2), (4) Date: Jan. 17, 2013

(87) PCT Pub. No.: WO2012/010952
PCT Pub. Date: Jan. 26, 2012

(65) Prior Publication Data
US 2013/0124026 A1  May 16, 2013

(30) Foreign Application Priority Data
Jul. 21, 2010  (JP) .................. 2010-164192

(51) Int. Cl.
*B60L 9/00* (2006.01)
*B60L 11/00* (2006.01)
(Continued)

(52) U.S. Cl.
CPC ............... *B60W 20/20* (2013.01); *B60K 6/48* (2013.01); *B60W 30/192* (2013.01); *B60W 50/06* (2013.01); *B60K 6/442* (2013.01); *B60W 10/06* (2013.01); *B60W 10/08* (2013.01); *B60W 20/00* (2013.01); *B60W 2510/244* (2013.01); *B60W 2520/10* (2013.01); *Y02T 10/6221* (2013.01); *Y02T 10/48* (2013.01); *B60W 2600/00* (2013.01); *Y10S 903/93* (2013.01)
USPC ............. 701/22; 180/65.23; 180/65.265; 903/930

(58) Field of Classification Search
CPC ....... B60K 6/48; B60K 6/442; B60W 30/192; B60W 50/06; B60W 10/06; B60W 10/08; B60W 20/20; B60W 20/00; B60W 2510/244; B60W 2520/10; B60W 2600/00; Y10S 903/93; Y02T 10/48; Y02T 10/6221
USPC .............. 701/22; 180/65.23, 65.265; 903/930
See application file for complete search history.

(56) References Cited

U.S. PATENT DOCUMENTS 5,327,987 A * 7/1994 Abdelmalek ............. 180/65.25
7,392,871 B2 * 7/2008 Severinsky et al. ........ 180/65.28
(Continued)

FOREIGN PATENT DOCUMENTS

DE  10 2008 042669 A1  4/2010
EP  1 469 195 A1  10/2004
(Continued)

OTHER PUBLICATIONS
Machine Translation DE102008042669, 2008, Thomas Schneider.*

*Primary Examiner* — Mary Cheung
*Assistant Examiner* — Frederick Brushaber
(74) *Attorney, Agent, or Firm* — Young Basile

(57) ABSTRACT

Compatibility between prevention of hunting of engine start and stop and improvement of fuel consumption is achieved during traveling with mode transitions. An apparatus for controlling a hybrid vehicle includes an engine, a motor-generator, a first clutch and a mode transition control means. The motor-generator is disposed in a drive system (power train) between engine and tire wheels to perform a start of the engine and drive for the tire wheels according to motor acceleration and power generation according to regeneration. The first clutch switches between an HEV mode and an EV mode. Mode transition control means implements a delay time from a time at which an engine stop allowance condition is established to a time at which a mode transition from the HEV mode to the EV mode is started in a high vehicle speed area that is higher than a delay time in another vehicle speed area.

10 Claims, 8 Drawing Sheets

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2006.01) |
| *B60K 6/48* | (2007.10) |
| *B60W 30/192* | (2012.01) |
| *B60W 50/06* | (2006.01) |
| *B60K 6/442* | (2007.10) |
| *B60W 10/06* | (2006.01) |
| *B60W 10/08* | (2006.01) |

(56) References Cited

U.S. PATENT DOCUMENTS

| | | | |
|---|---|---|---|
| 2002/0093774 A1* | 7/2002 | Chung | 361/2 |
| 2003/0078707 A1* | 4/2003 | Shioda et al. | 701/22 |
| 2004/0046394 A1 | 3/2004 | Lim | |
| 2009/0204280 A1* | 8/2009 | Simon et al. | 701/22 |
| 2009/0248229 A1* | 10/2009 | Okamura et al. | 701/22 |
| 2010/0145562 A1 | 6/2010 | Moran | |

FOREIGN PATENT DOCUMENTS

| | | |
|---|---|---|
| EP | 1 859 982 A2 | 11/2007 |
| WO | 02/063163 A1 | 8/2002 |

* cited by examiner

APPARATUS AND METHOD FOR CONTROLLING HYBRID VEHICLE

CROSS-REFERENCE TO RELATED APPLICATIONS

This application claims priority from Japanese Patent Application No. 2010-164192, filed Jul. 21, 2010, which is herein incorporated by reference in its entirety.

TECHNICAL FIELD

The present invention relates to an apparatus and method for controlling a hybrid vehicle provided with a hybrid vehicle mode (hereinafter, also referred to as an HEV mode) and an electric vehicle mode (hereinafter, also referred to as an EV mode) as traveling modes and that executes a mode transition between the HEV mode and the EV mode.

BACKGROUND

Japanese Patent Application Publication No. 2009-234565 (which corresponds to United States Patent Application Publication No. US2010/0312427) exemplifies a previously proposed mode transition control apparatus for a hybrid vehicle in which mode transition from the HEV mode to the EV mode is deferred for a prescribed time by estimating that, as a speed for an accelerator to be returned toward zero (release) position during the HEV mode becomes faster, a frequency of subsequent re-depression operations of the accelerator is high.

BRIEF SUMMARY

In the previously proposed mode transition control apparatus, mode transition from the HEV mode to the EV mode is delayed only when accelerator return speed ΔAPO is fast during traveling in the HEV mode. Therefore, during the HEV mode while traveling in a high vehicle speed area, mode transition to the EV mode is immediately carried out in response to a slow accelerator return operation. Thereafter, mode transition to the HEV mode is again carried out when an insufficient driving force is brought out in the EV mode. Under such conditions, a hunting of engine start and stop occurs. In addition, if traveling during the HEV mode in a low vehicle speed area in which mode transition to the EV mode is desired to be carried out at an early timing, and accelerator return speed ΔAPO is fast, mode transition to the EV mode is delayed, worsening fuel consumption.

It is, therefore, an object of the present invention to provide an apparatus for controlling a hybrid vehicle that can achieve compatibility between prevention of hunting of the engine start and stop and improvement of the fuel consumption (a fuel economy) while traveling with mode transitions.

To achieve the above-described object, embodiments of an apparatus for controlling a hybrid vehicle can comprise an engine, a motor-generator, mode switching means or device and mode transition control means.

The motor-generator is disposed in a drive system that extends from the engine to a driving wheel for performing a start of the engine and a drive for the driving wheel based on a motor acceleration and a power generation according to a regeneration driven by the driving wheel.

The mode switching means is disposed in a linkage section between the engine and the motor-generator for switching between the hybrid vehicle mode, in which the hybrid vehicle is powered by both the engine and the motor-generator, and the electric vehicle mode, in which the hybrid vehicle is powered by the motor-generator.

The mode transition control means introduces a delay into a period extending from a time at which an engine stop allowance (or permission) condition is established to a time at which the mode transition is initiated when the mode transition from the hybrid vehicle mode to the electric vehicle mode is effected based on whether the vehicle is operating in a high vehicle speed area or is operating in another vehicle speed area.

During HEV mode traveling in the high vehicle speed area, the mode transition control means implements a delay time from the time at which the engine stop allowance condition is established to the time at which the mode transition is initiated when the mode transition from the hybrid vehicle mode to the electric vehicle mode is effected.

For example, suppose a case where, even if the engine stop allowance condition is established in the hybrid vehicle mode traveling in the high vehicle speed area, the accelerator depression operation is carried out during the delay time and the engine stop allowance condition becomes, in turn, unestablished. In this case, the hybrid vehicle mode is continued. Hence, the mode transition to the electric vehicle mode is delayed on condition that the vehicle travels in the high vehicle speed area, irrespective of the accelerator operation, so that hunting of the engine start and stop can be prevented.

On the other hand, the mode transition control means performs control to initiate the mode transition from the hybrid vehicle mode to the electric vehicle mode without delay when the engine stop allowance condition is established during traveling in a low vehicle speed area.

For example, if the mode transition from the electric vehicle mode is immediately carried out during traveling in the low vehicle speed area, the frequency of holdings in the hybrid vehicle mode is decreased as compared with a case where the mode transition with delay is carried out. In addition, since an engine friction is separated in the electric vehicle mode after the mode transition, regenerative energy is increased as compared with regeneration in the hybrid vehicle mode. Therefore, fuel consumption (fuel economy) can be improved when the mode transition to the electric vehicle mode is effected without delay with the low vehicle speed area traveling as a condition.

Consequently, compatibility between the prevention of hunting of the engine start and stop and the improvement in fuel consumption can be achieved at the time of the vehicular runs with mode transitions.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
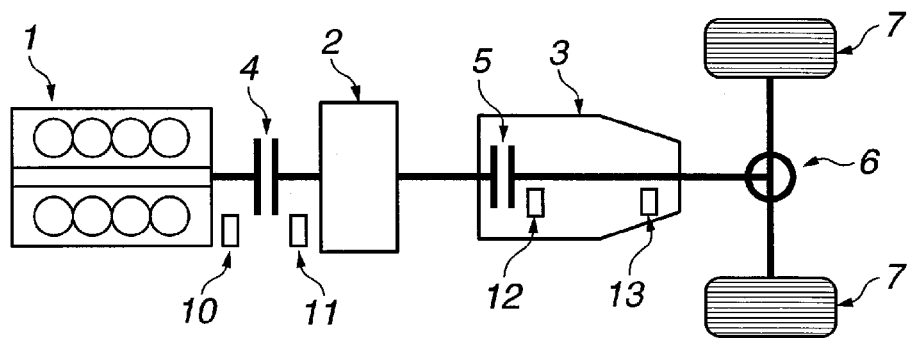
FIG. 1 is a schematic view of a power train of a hybrid vehicle to which embodiments of a control apparatus taught herein can be applied.

FIG. 1 shows a configuration view of a power train representing the power train of a hybrid vehicle to which a control apparatus in certain embodiments of the invention is applicable. FIG. 1 includes an engine 1, a motor-generator 2, an automatic transmission 3, a first clutch 4 (also called mode switching means), a second clutch 5, a differential gear 6 and tire (or driving) wheels 7.

The power train configuration includes engine 1, motor-generator 2 and two (first and second) clutches 4, 5.

An output shaft of engine 1 is coupled with an input shaft of motor-generator 2 (abbreviated as MG) via first clutch 4 (abbreviated as CL1), whose torque capacity is variable. An output shaft of motor-generator 2 is coupled with an input shaft of automatic transmission 3 (abbreviated as AT). An output shaft of automatic transmission 3 is coupled with tire wheels 7 via differential gear 6.

An engagement element of torque capacity variable clutches and brakes that play a role of different power transmissions within automatic transmission 3 in accordance with its shift state is used for second clutch 4 (abbreviated as CL2). Thus, automatic transmission 3 synthesizes the power of engine 1 inputted via first clutch 4 and the power inputted from motor-generator 2 and outputs the synthesized power to tire wheels 7.

First clutch 4 and second clutch 5, for example, may be a wet-type multiple plate clutch that can continuously control an oil flow quantity and a hydraulic pressure by means of a proportional solenoid. This power train (drive system) has two driving (traveling) modes in accordance with a connection state of first clutch 4, namely, an EV mode in which the vehicle travels only with power of motor-generator 2 in a disconnection (release) state of first clutch 4, and an HEV mode in which the vehicle travels with power of both of engine 1 and motor-generator 2 in a connection (engagement) state of first clutch 4.

Various sensors for this power train include an engine speed sensor 10 that detects a revolution speed of engine 1, an MG revolution sensor 11 that detects a revolution speed of motor-generator 2, an AT input revolution sensor 12 that detects an input shaft revolution speed of automatic transmission 3 and an AT revolution speed sensor 13 that detects an output shaft revolution speed of automatic transmission 3.

Figure 2:
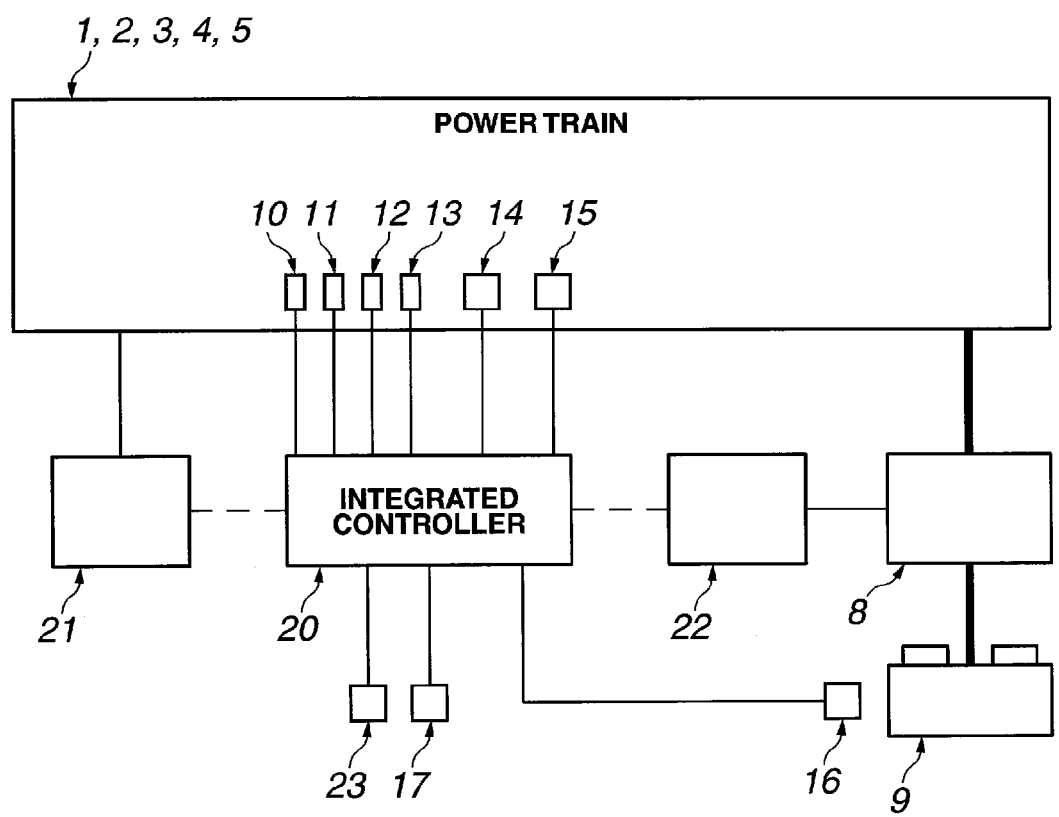
FIG. 2 is a schematic view of a control system according to certain embodiments of the invention.

FIG. 2 shows a control system configuration view of the hybrid vehicle to which the control apparatus in the preferred embodiment is applicable. The control system configuration will, hereinafter, be described on a basis of FIG. 2.

As shown in FIG. 2, a control system (or control apparatus) according to certain embodiments of the invention includes an integrated controller 20, an engine controller 21, a motor controller 22, an inverter 8, a battery 9, a solenoid valve 14, a solenoid valve 15, an accelerator opening angle sensor 17, a brake hydraulic pressure sensor 23 and an SOC sensor 16.

Integrated controller 20 integrally controls an operating point of the power train (the drive system). This integrated controller 20 selects a driving mode that can realize the driving force that a vehicle driver desires in accordance with accelerator opening angle APO, a battery charge state SOC and a vehicle speed VSP (which is proportional to the output shaft revolution speed of the automatic transmission). Then, integrated controller 20 issues a target MG torque or a target MG revolution speed to motor controller 22, a target engine torque to engine controller 21 and a drive signal to each or either of solenoid valves 14, 15.

Engine controller 21 controls engine 1. Motor controller 22 controls motor-generator 2. Inverter 8 drives motor-generator 2. Battery 9 stores electrical energy. Solenoid valve 14 controls the hydraulic pressure of first clutch 4. Solenoid valve 15 controls the hydraulic pressure of second clutch 5. Accelerator opening angle sensor 17 detects accelerator opening angle APO. Brake hydraulic pressure sensor 23 detects a brake hydraulic pressure BPS. SOC sensor 16 detects a charge state of battery 9.

Figure 3:
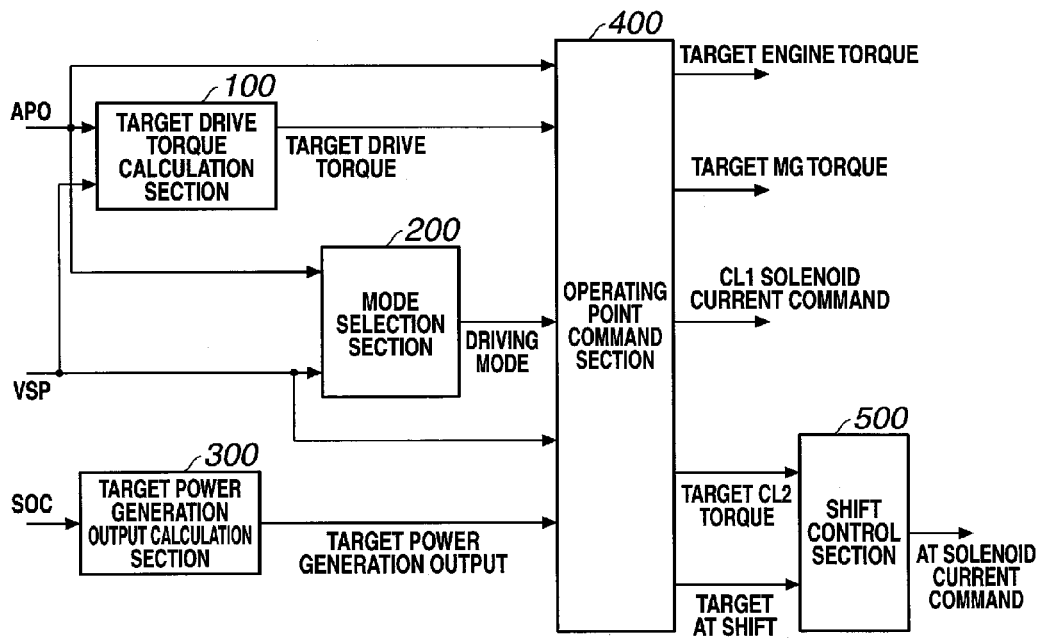
FIG. 3 is a block diagram of one embodiment of an integrated controller according to FIG. 2.

FIG. 3 shows a block diagram representing integrated controller 20 in an embodiment. Integrated controller 2 and the other controllers described herein generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) sections of the integrated controller 10 described herein (and the other controllers where appropriate) could be, for example, implemented in software as the executable programs, or could be implemented in whole or in part by separate hardware in the form of one or more integrated circuits (IC). Integrated controller 10 can be an engine control unit (ECU) as known in the art programmed as described herein. Other controllers described herein can be similarly structured. Also, although multiple controllers are shown, fewer or more are possible.

Integrated controller 20 includes a target drive torque calculation section 100, a mode selection section 200, a target power generation output calculation section 300, an operating point command section 400 and a shift control section 500.

Figure 4A:
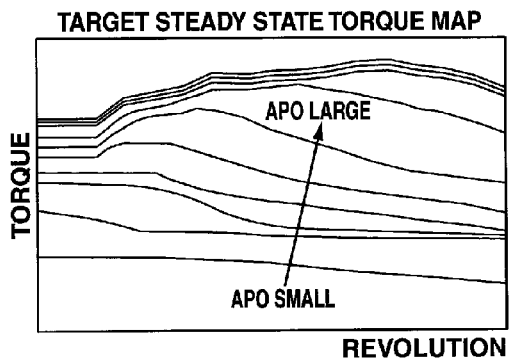
FIG. 4A is a steady-state target torque map for use in the control system accordingly to FIG. 2.
Figure 4B:
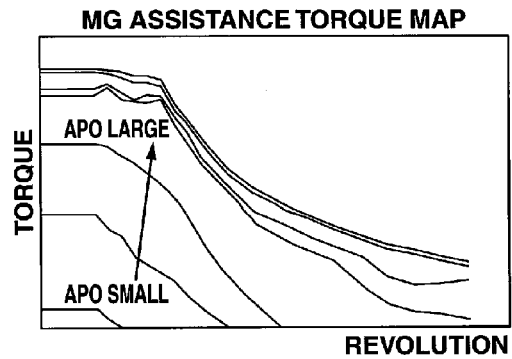
FIG. 4B is a MG assistance torque map for use in the control system according to FIG. 2.

Target drive torque calculation section 100 calculates a target steady state drive torque and a MG assistance torque from accelerator opening angle APO and vehicle speed VSP using the target steady state drive torque map shown in FIG. 4A and the MG assistance torque map shown in FIG. 4B, respectively. In the maps shown by example in FIGS. 4A and 4B, vehicle speed VSP is represented on the horizontal axis as revolutions.

Figure 5:
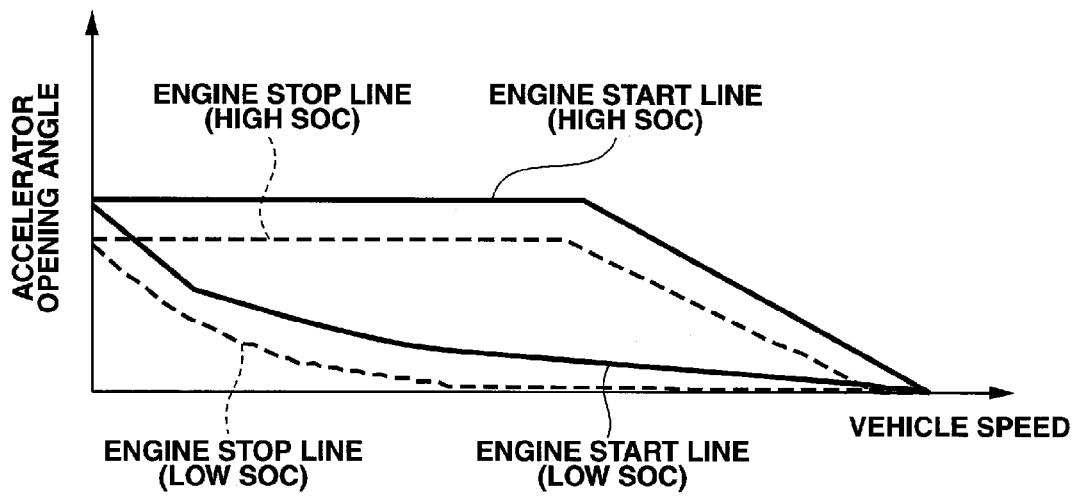
FIG. 5 is a map representing engine start and stop lines used in the control system according to FIG. 2.

Mode selection section 200 calculates the desired driving mode of HEV mode or EV mode using an engine start-and-stop line map set according to accelerator opening angle APO for each vehicle speed shown by example in FIG. 5. The engine start line and the engine stop line are set such that, as battery SOC becomes lower, they are reduced in a direction in which accelerator opening angle APO becomes small. As represented by the characteristics of the engine start lines (high SOC, low SOC) and the engine stop lines (high SOC, low SOC), engine start/stop varies with battery SOC (state of charge).

It should herein be noted that, in an engine start process, integrated controller 20 controls a torque capacity of second clutch 5 such that second clutch 5 is slipped at a time point at which accelerator opening angle APO exceeds the engine start line shown in FIG. 5 in the EV mode state. Then, after a determination that second clutch 5 has started the slip, engagement of first clutch 4 is initiated to raise the engine revolutions. If the engine revolutions have reached a revolution speed at which engine 1 can be in an initial explosion state, engine 1 is in a combustion state. When the motor revolution speed and the engine speed become close to each other, first clutch 4 is completely engaged. Thereafter, second clutch 5 is locked up, and the mode transition to the HEV mode is carried out.

Figure 6:
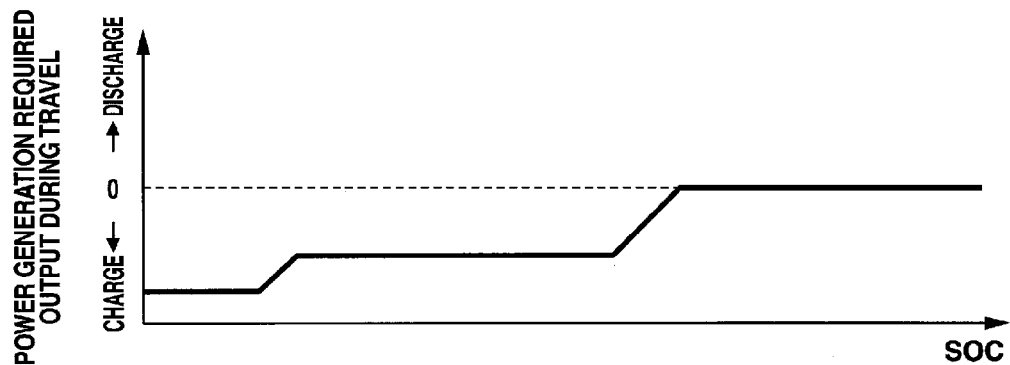
FIG. 6 is a graph representing a power generation output required during travel.
Figure 7:
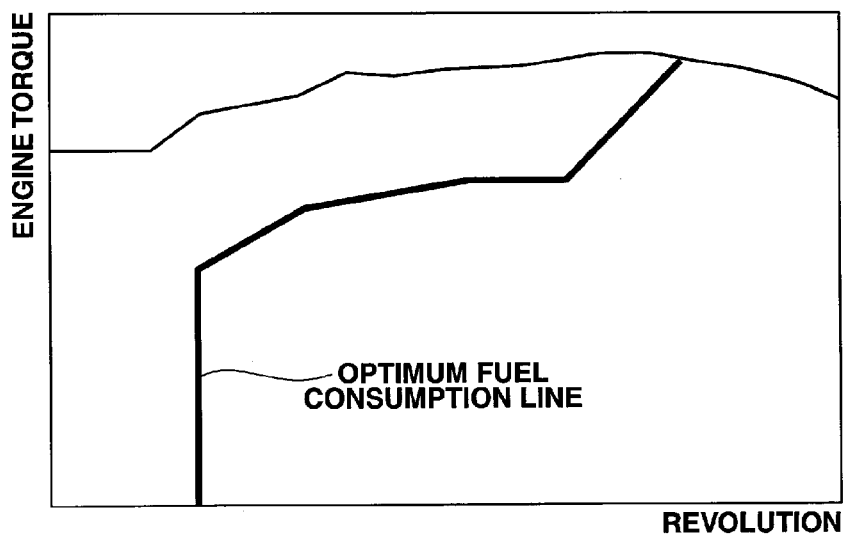
FIG. 7 is a graph representing an optimum fuel consumption line used in the control system according to FIG. 2.

Target power generation output calculation section 300 calculates a target power generation output from battery SOC using a power generation output required during travel map shown by example in FIG. 6. In addition, target power generation output calculation section 300 calculates an output required to increase an engine torque from its existing operating point to an optimum fuel consumption line shown in FIG. 7, for example, and compares the calculated required output with the target power generation output. Then, target power generation output calculation section 300 adds the lesser of the two compared output values to the engine output.

Operating point command section 400 receives accelerator opening angle APO, the target steady state torque, the target MG assistance torque, the target driving mode, vehicle speed VSP and the required power generation output. Then, operating point command section 400 calculates a transient target engine torque, a target MG torque, a target CL2 torque capacity, a target gear shift ratio and a CL1 solenoid current command.

Figure 8:
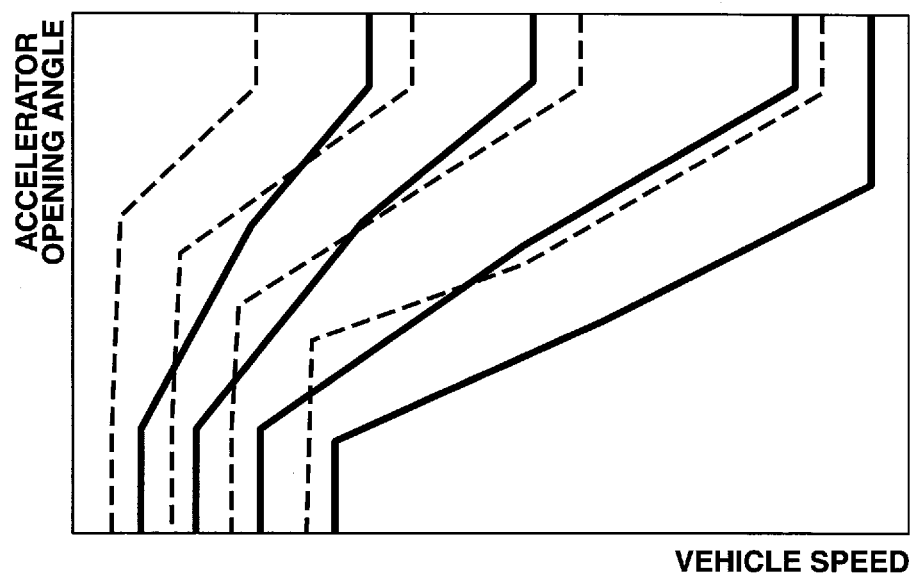
FIG. 8 is a shift map showing one example of gear shift lines in an automatic transmission according to FIG. 1.

Shift control section 500 drivingly controls the solenoid valves within automatic transmission 3 to achieve the target CL2 torque capacity and the target gear shift ratio. FIG. 8 shows one example of a shift line map used in the gear shift control. Shift control section 500 determines to which stage the vehicle should be shifted from the present shift stage using vehicle speed VSP and accelerator opening angle APO in the shift line map and performs a gear shift to the subsequent stage by controlling a shift clutch if a shift request occurs.

Figure 9:
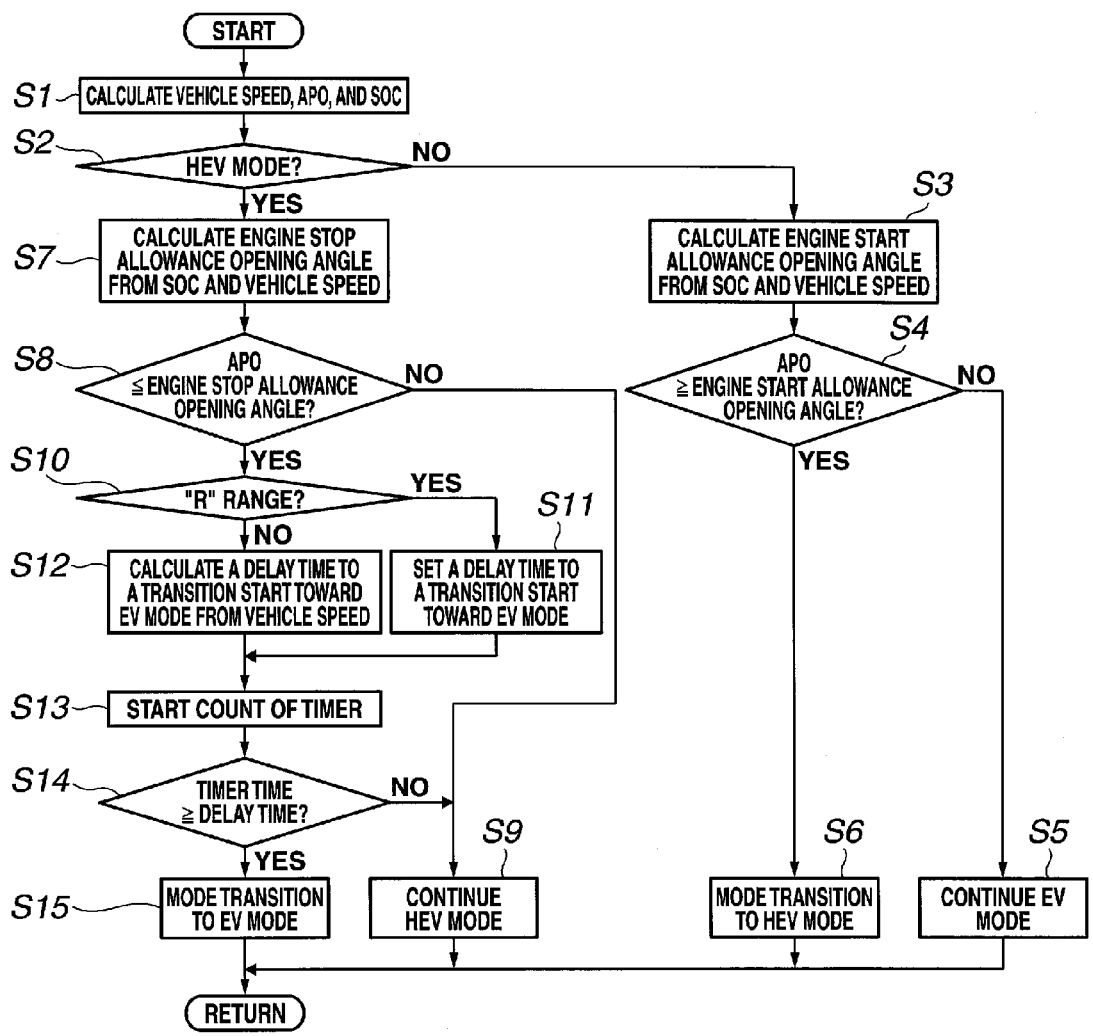
FIG. 9 is a flowchart of a mode transition control process executed by the integrated controller according to FIG. 3.

FIG. 9 shows a flowchart of a mode transition control process executed in integrated controller 20 in an embodiment of the invention. In first step S1, In first step S1, integrated controller 20 calculates vehicle speed VSP, accelerator opening angle APO and battery SOC.

Next, integrated controller 20 determines whether the traveling mode presently selected is the HEV mode or not in step S2. If Yes (HEV mode is selected), the routine goes to step S7. If No (EV mode is selected), the routine goes to step S3.

At step S3, integrated controller 20 determines an engine start line characteristic in FIG. 5 according to the battery SOC. Then, based on the engine start line characteristic and vehicle speed VSP, an engine start allowance opening angle is calculated and the routine goes to step S4. The engine start allowance opening angle is the angle accelerator opening angle APO must meet or exceed in order to start engine 1 for HEV mode.

After this calculation, integrated controller 20 determines whether accelerator opening angle APO is equal to or larger (wider) than the calculated engine start allowance opening angle in step S4. If APO is equal to or larger than the engine start allowance opening angle, the routine goes to step S6 to perform mode transition from the EV mode to the HEV mode with a passage of the engine start control. If APO is less than engine start allowance opening angle, the routine goes to step S5 to continue operation in the EV mode. The routine goes to a return whether step S5 or S6 is performed.

Returning to step S2, after a determination that the HEV mode is selected, integrated controller 20 determines the engine stop line characteristic in FIG. 5 according to battery SOC in step S7. Then, integrated controller 20 calculates an engine stop allowance opening angle based on the engine stop line characteristic and vehicle speed VSP and the routine goes to step S8. The engine stop allowance opening angle is the angle accelerator opening angle APO must be no higher than in order to stop engine 1 for EV mode.

At step S8, integrated controller 20 determines whether accelerator opening angle APO is equal to or smaller (narrower) than the calculated engine stop allowance opening angle. If APO is equal to or smaller than the engine stop allowance opening angle, the routine goes to step S10. Otherwise (APO>the engine stop allowance opening angle), the routine goes to step S9 to continue operation in the HEV mode and proceed to return.

In APO is less than or equal to the engine stop allowance opening angle, integrated controller 20 determines whether a range position selected at automatic transmission 3 is a R range (reverse speed) in step S10.

If the response at step S10 is yes (meaning that the range selection is the R range), integrated controller 20 sets a delay time from a time at which an engine stop allowance condition is established (namely, APO≤engine stop allowance opening angle in step S8) to a time at which the mode transition to the EV mode is initiated in step S11. It should be noted that the delay time established given the R range selection is a long fixed time without regard to the magnitude of the vehicle speed.

In contrast, if the response at step S12 is no (meaning that the range selection is other than the R range, integrated controller 20 calculates the delay time from the time at which the engine stop allowance condition is established (step S8) to the time at which the mode transition to the EV mode is initiated from the vehicle speed in step S12.

Figure 11:
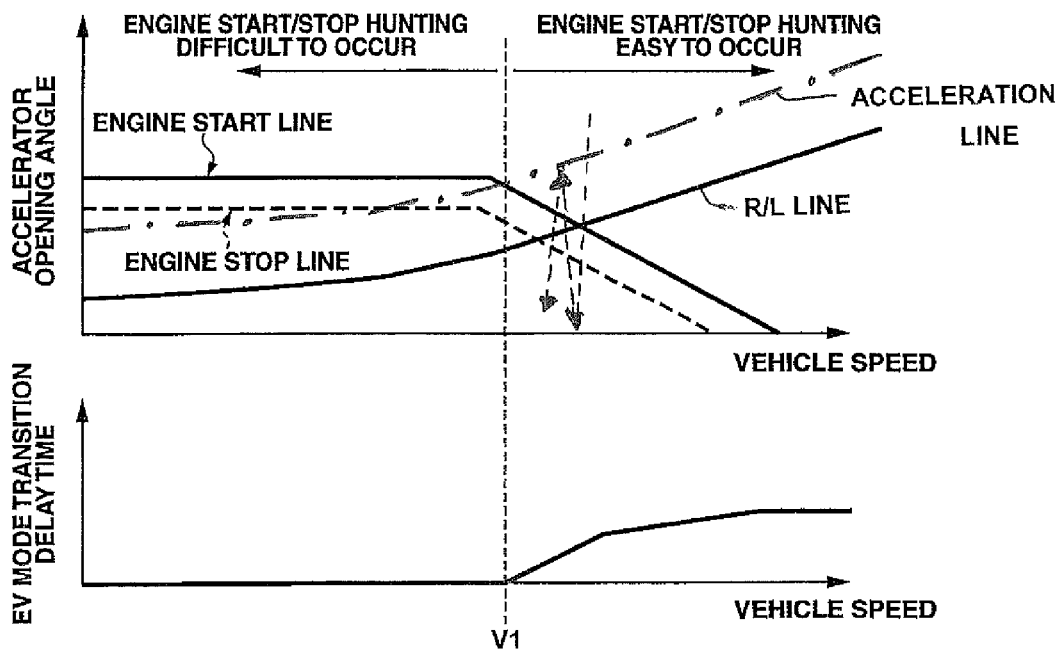
FIG. 11 is a map used to explain a delay time set for a mode transition from the HEV mode to the EV mode in mode transition control in an embodiment.
Figure 12:
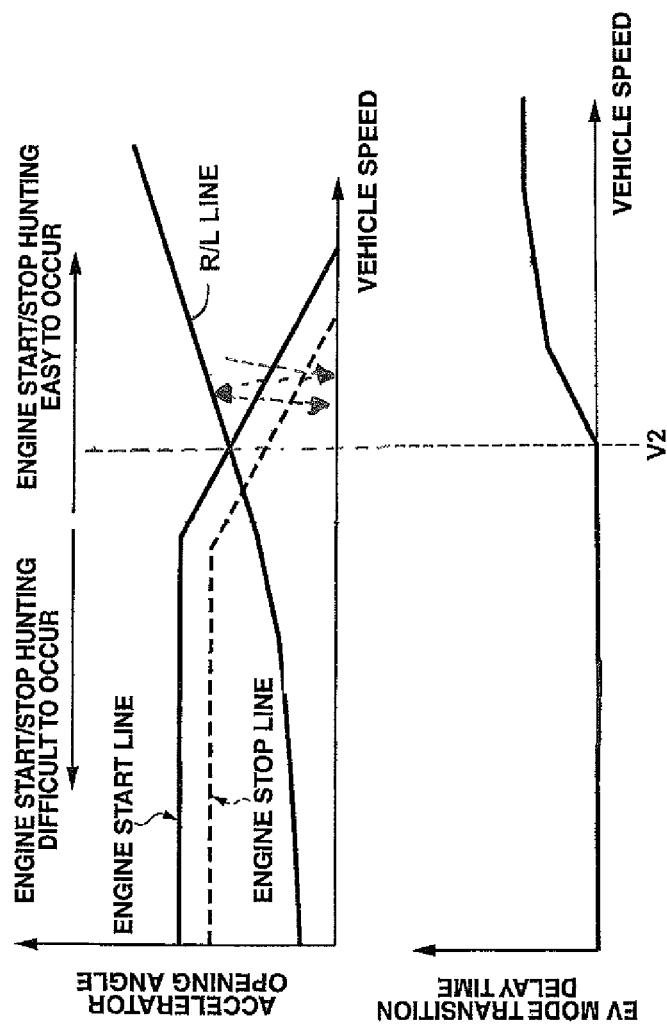
FIG. 12 is a map used to explain the delay time set for the mode transition from the HEV mode to the EV mode in mode transition control in an embodiment.

As shown in FIG. 11 and FIG. 12, the delay time when any one of the ranges other than the R range (for example, a D range) is selected is calculated as a time that becomes longer as the vehicle speed becomes higher in a high vehicle speed area than a vehicle speed threshold value (or a criterion vehicle speed). Then, the vehicle speed threshold value is set to the vehicle speed equal to or higher than a vehicle speed at which a constant speed (also called a cruise) run in the EV mode can be made or to the vehicle speed equal to or higher than a vehicle speed at which constant acceleration can be carried out from a constant speed run in the EV mode. It should be noted that the vehicle speed threshold value in a preferred embodiment is set to the vehicle speed when the engine stop line is placed at a position above an accelerator opening angle line at which the constant speed run can be made at each vehicle speed as shown in FIG. 12, but the vehicle speed threshold value can be set to the vehicle speed when the engine stop line is placed at a position above an accelerator opening angle line at which constant acceleration can be carried out as shown in FIG. 11.

After setting of the delay time in step S11 or in step S12, integrated controller 20 initiates a count by means of a timer to measure a time of the timer in step S13.

In next step S14, integrated controller 20 determines whether the timer time measured from the time at which the engine stop allowance condition is established (at step S8) is equal to or greater than the delay time set at step S11 or calculated at step S12. If the response to the query of step S14 is No (timer time<delay time), the routine goes to step S9 to continue operating in the HEV mode and then proceeds to return.

If the response to the query of step S14 is Yes (timer time≥delay time), the routine goes to step S15, where integrated controller 20 initiates mode transition from the HEV mode to the EV mode. Specifically, integrated controller 20 determines the engagement states of first and second clutches 4, 5 and initiates a fuel cutoff to engine 1 with the vehicular state and driving situation of the driver as parameters. Preferably, after an engagement torque capacity of second clutch 5 is reduced in such a way that a shock along with the engine stop can be absorbed, the supply of fuel to engine 1 is stopped and, finally, first clutch 4 is opened (released). After this mode transition of step S15, the routine proceeds to return.

Next, operation of the embodiment described above is made by dividing the operations into various actions as described below. First, an explanation of an assumed comparative example is made.

In the comparative example, mode transition control in which the transition from the HEV mode to the EV mode is deferred for a prescribed time is performed by estimating that, as accelerator return speed ΔAPO becomes faster during HEV mode traveling, the frequency of subsequent re-depressions on the accelerator becomes increased.

However, even when accelerator return speed ΔAPO is small, it may often be better to elongate the travel in the HEV mode when the accelerator is returned toward zero position in the high vehicle speed area. For example, since, the motor revolution speed is high in the high vehicle speed area and it is necessary to secure the engine start torque during the traveling in the EV mode in the hybrid vehicle of one-motor-and-two-clutch system configuration as in the case of the illustrated embodiment, the motor torque used for the drive during the traveling in the EV mode becomes reduced. Therefore, a traveling region in which the vehicle travels in the EV mode becomes narrowed, and, in the high vehicle speed area, a driving force needed to obtain the constant cruise speed cannot be achieved when traveling in the EV mode.

Figure 10:
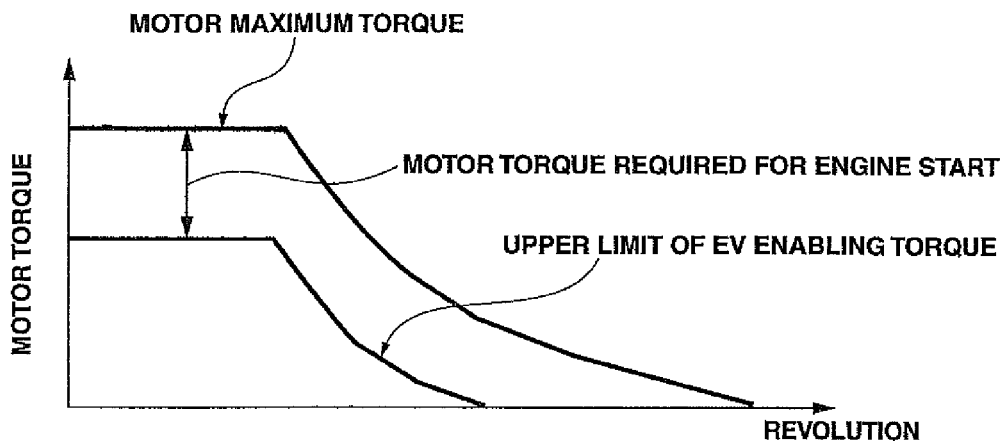
FIG. 10 is a graph representing an EV traveling enabling torque in a motor-generator in an embodiment of the invention.

In other words, in the one-motor-and-two-clutch configured hybrid vehicle, it is necessary to leave the motor torque required for the engine start during the traveling in the EV mode as shown in FIG. 10. Then, in the region in which the motor revolution speed is high, a motor maximum torque is decreased. Hence, a torque (EV enabling torque upper limit), which is a subtraction of the engine start torque from the motor maximum torque, becomes reduced.

In such a case, there is a request to transit the mode to the EV mode when the accelerator is in an OFF state (the driver releases the accelerator) in order to improve the fuel consumption in the high vehicle speed area (if, during deceleration, first clutch CL1 is released to separate an engine friction, regeneration energy is increased to improve the fuel consumption). On the other hand, when the mode transition to the EV mode is allowed during the accelerator OFF state in the high vehicle speed area in order to improve the fuel consumption, the traveling region in the EV mode becomes narrowed as described above. Hence, it is necessary to perform the mode transition to the HEV mode with an immediate start of the engine if the driver tries to make the constant speed run. In addition, in the high speed range, the frequency of such constant speed runs is high. However, few drivers drive a vehicle with the accelerator opening angle constant. Many more drivers drive with repetitive accelerator releases and depressions.

Hence, in the high vehicle speed area, it is necessary to delay the mode transition for the prescribed time when the mode transition from the HEV mode to the EV mode is effected irrespective of the accelerator OFF or irrespective of accelerator return speed ΔAPO. However, the mode transition to the EV mode cannot be delayed only when accelerator return speed ΔAPO is fast in the comparative example. As a result, hunting of engine start-and-stop occurs.

In contrast, even though accelerator return speed ΔAPO value is large, it may often be better to effect the mode transition from the HEV mode to the EV mode as early as possible. Since the motor revolution is low in the low vehicle speed area in contrast to that in the high vehicle speed area, sufficient EV driving force can be secured even though the engine start torque has been secured. Therefore, one can set the accelerator opening angle through which the mode transition to the EV mode is carried out to be large (wide). In this case, even though an immediate mode transition to the EV mode is carried out when accelerator return speed ΔAPO is large, hunting of the engine start-and-stop has difficultly occurring.

However, in the comparative example, in a case where accelerator return speed ΔAPO is large, the mode transition to the EV mode is delayed for the prescribed time. Hence, the frequency of the traveling in the HEV mode is increased and the fuel consumption becomes accordingly worsened. In addition, if a regeneration of power is carried out in the HEV mode, the regenerative energy is decreased due to the energy consumption corresponding to the engine friction. Worsening of fuel consumption is introduced.

In contrast to the comparative example, embodiments described herein set a delay time irrespective of a returning speed of the accelerator (accelerator return speed ΔAPO). For example, an embodiment herein performs a mode transition control action from the EV mode to the HEV mode as follows with reference to FIG. 9.

During EV mode traveling where the engine start allowance condition is not established, the flow of steps from step S1→step S2→step S3→step S4→step S5 to return is repeated so that the EV mode is continued.

In EV mode traveling, when the engine start allowance condition is established by carrying out an accelerator depression operation or so forth, the flow of steps from step S1→step S2→step S3→step S4→step S6 to return is repeated. At step S6, if the engine start allowance condition is established, the mode transition from the EV mode to the HEV mode is immediately initiated without time waiting along with the engine start control described above.

In the way described above, when the accelerator depression operation is carried out during the traveling in the EV mode or when battery SOC is lowered so that the engine start allowance condition is established, even with the accelerator maintained in a depression state, the mode transition from the EV mode to the HEV mode is immediately carried out. Hence, the control apparatus in the embodiment can sufficiently respond to the request for driving force by the driver and to the charge request to charge battery 9.

As shown with reference to FIG. 9, the present embodiment also performs a mode transition control action from the HEV mode to the EV mode at a time of high vehicle speed forward travel.

Specifically, when the engine stop allowance condition is not established during the HEV mode forward travel, the flow of steps from step S1→step S2→step S7→step S8→step S9 to return is repeated so that the HEV mode is continued.

In contrast, at the time of the HEV mode forward travel and where the engine stop allowance condition is established, the flow of steps from step S1→step S2→step S7→step S8→step S10→step S12 is performed. At step S12, in a case where the traveling vehicle speed is in the high vehicle speed area equal to or above the vehicle speed threshold value, a longer delay time is calculated as the vehicle speed becomes higher. Hence, until the calculated delay time lapses, the flow of steps from step S12→step S13→step S14→step S9 to return is repeated so that the HEV mode is continued.

Thereafter, when the calculated delay time has expired, the flow of steps from step S13→step S14→step S15 is carried out. Then, at step S15, the mode transition from the HEV mode to the EV mode is initiated at a timing delayed by the delay time from a time at which the engine stop allowance condition is established. It should be noted that, in the delay time, repetitive determinations of whether the engine stop allowance condition is established or not are made. As a result, for example, in a case where an accelerator operation is carried out during the delay time, the engine stop allowance condition is not met and, thus, the HEV mode is continued.

In this way, in this embodiment, mode transition control is based on the engine stop allowance condition (a mode transition allowance condition from the HEV mode to the EV mode) set according to accelerator opening angle APO and a motor characteristic. Then, when the mode transition from the HEV mode to the EV mode is carried out, the time from a time at which the engine stop allowance condition is established to the time at which the mode transition is initiated, in the high vehicle speed area, is set to be longer than that set in another vehicle speed area. Hence, the problem in the comparative example where the traveling region in which the vehicle travels in the EV mode is narrowed is solved so that hunting of the engine start-and-stop can be prevented.

In an embodiment, the vehicle speed threshold value can be set equal to or higher than the vehicle speed at which a constant speed run can be made in the EV mode or the vehicle speed at which a constant acceleration is made from a constant speed run. The delay time from the time at which the engine stop allowance condition is established to the time at which the mode transition is initiated is set to be longer as the vehicle speed becomes higher in the vehicle speed area equal to or higher than the vehicle speed threshold value. FIGS. 11 and 12 are used to explain a reason for setting the delay time from the time at which the engine stop allowance condition is established to the time at which the mode transition from the HEV mode to the EV mode is initiated longer in the high vehicle speed area than in the other vehicle speed area (e.g., low vehicle speed area).

In a case where the engine start line has a sufficient margin against the accelerator opening angle through which a constant speed run can be made, an engine start is not generated if acceleration is carried out to some degree. Hence, engine start hunting does not occur. However, if the engine start line approaches or becomes equal to the accelerator opening angle through which a constant speed run or constant acceleration from a constant speed run can be made, operation becomes more complicated since an engine start and stop frequently occur responsive to the accelerator being frequently switched between ON and OFF by a driver trying to maintain the vehicle speed or acceleration.

More specifically, and with initial reference to FIG. 11, at a vehicle high speed area, a gap between the engine start line and a constant acceleration line (e.g. 0.1 G line) becomes small, so that an engine stop/start hunting easily occurs if no time delay is provided. For example, the constant acceleration line (the dot-dash line) is a characteristic line the driver wishes to keep by regulating the accelerator pedal. In this example, it is drawn in parallel with the line R/L, which is a running characteristic curve indicating the necessary accelerator opening angle needed to keep a constant travel speed (i.e., it represents the accelerator opening angle through which a constant speed run can be made at each vehicle speed). Accordingly, the constant acceleration line represents a speed from the line R/L that would achieve a constant acceleration. When operating in a high speed area, and in the absence of a time delay, a mode change to the EV mode occurs when crossing the engine stop line responsive to the driver releasing the accelerator pedal. Then, when a driver wishes to keep to the constant acceleration line and presses the accelerator pedal, the vehicle returns to the HEV mode by crossing the engine start line before reaching the constant acceleration line. This zigzag operation is shown in FIG. 11. By providing a time delay that increases over threshold speed V1, the zigzag operation (frequent engine starts/stops) is minimized. The vehicle speed threshold is set at the vehicle speed V1 at which the constant acceleration line crosses the engine start line. At a lower speed area, when the mode is changed to EV and the driver subsequently presses the accelerator pedal, the vehicle approaches the constant acceleration line first, i.e., before reaching the engine start line, so that hunting does not occur.

Similarly, FIG. 12 demonstrates the same principles where the line R/L is used to set the vehicle speed threshold. At a vehicle high speed area, a gap between the engine start line and the line R/L becomes small, so that an engine stop/start hunting easily occurs if no time delay is provided. When operating in a high speed area, and in the absence of a time delay, a mode change to the EV mode occurs when crossing the engine stop line responsive to the driver releasing the accelerator pedal. Then, when a driver wishes to keep to the line R/L representing a constant speed run by pressing the accelerator pedal, the vehicle returns to the HEV mode by crossing the engine start line before reaching the line R/L. By providing a time delay that increases over threshold speed V2, the zigzag operation (frequent engine starts/stops) is minimized. The vehicle speed threshold is set at the vehicle speed V2 at which the line R/L crosses the engine start line. At a lower speed area, when the mode is changed to EV and the driver subsequently presses the accelerator pedal, the vehicle approaches the constant speed line R/L first, i.e., before reaching the engine start line, so that hunting does not occur.

In an embodiment, the vehicle speed threshold value is set to a lower vehicle speed as battery SOC becomes lowered. That is, as the battery SOC becomes lowered, as shown in FIG. 5, the engine start line moves in the low opening angle direction so as to come near to the accelerator opening angle through which the constant speed run or constant acceleration can be made. Therefore, it is necessary to set the vehicle speed threshold value that elongates the time from a time at which the engine start allowance condition is established to a time at which the mode transition is initiated toward the low vehicle speed side. Hence, even though the battery SOC is lowered, hunting resulting in engine start-and-stop can be prevented.

As also shown with reference to FIG. 9, the present embodiment performs a mode transition control action from the HEV mode to the EV mode at a time of low-vehicle speed forward travel as follows.

When the engine stop allowance condition is not established during the forward traveling in the HEV mode, the flow of steps from step S1→step S2→step S7→step S8→step S9 to return is repeated. Thus, the HEV mode is continued.

If the engine stop allowance condition is established during forward traveling in the HEV mode, the flow of steps from step S1→step S2→step S7→step S8→step S10→step S12 is performed.

If, the traveling vehicle speed is in the low vehicle speed area lower than the vehicle speed threshold value at step S12, the delay time can be calculated as zero. Hence, if the engine stop allowance condition is met in step S8, the flow of steps of step S1→step S2→step S7→step S8→step S10→step S12→step S13→step S14→step S15 is advanced. In this case, the mode transition from the HEV mode to the EV mode is immediately initiated at step S15.

As described above, in this embodiment, the delay time from the time at which the engine stop allowance condition is established to the time at which the mode transition is initiated is set to zero time in the low vehicle speed area when the mode transition from the HEV mode to the EV mode is carried out. Hence, worsened fuel consumption in the comparative example caused by more frequent traveling in the HEV mode when mode transition to the EV mode is delayed unnecessary is solved. Further, the increase in the regenerative energy due to a decrease in the frequency of the HEV mode using engine 1 (increase in the frequency of the EV mode) and the separation of the engine friction due to the release of first clutch 4 in the low vehicle speed region improves the fuel consumption.

The present embodiment further performs a mode transition control action from the HEV mode to the EV mode at the time of reverse travel as follows with reference to FIG. 9.

When the engine stop allowance condition is not established during reverse traveling in the HEV mode, the flow of steps from step S1→step S2→step S7→step S8→step S9→return is repeated so that the HEV mode is continued.

When the engine stop allowance condition is established during HEV mode reverse traveling, the flow of steps from step S1→step S2→step S7→step S8→step S10→step S11 is carried out. At step S11, a long delay time is set irrespective of the vehicle speed. Hence, the flow of steps from step S11→step S13→step S14→step S9 to return is repeated so that the HEV mode is continued as long as the time does not reach the delay time. It should be noted that the determination of whether the engine stop allowance condition is established or not is repeated during the delay time. For this reason, for example, the HEV mode is continued since the engine stop allowance condition is not established in a case where the accelerator depression operation is carried out during the delay time.

In an embodiment, when R range is selected, the time from the time at which the engine stop allowance condition is established to the time at which the mode transition is initiated is elongated in the whole vehicle speed area when the mode transition from the HEV mode to the EV mode is effected. That is, since, in an R range (a reverse speed range), a driving posture is unstable and a field of view of the driver becomes narrowed, it is not desirable to change vehicular behavior. If the engine start and the engine stop are frequently repeated, vehicular behavior is often disturbed during the engine start or during the engine stop. Hence, requests that transition to the EV mode and to the HEV mode are reduced to as few as possible. Therefore, in the R range, the start of the mode transition from the HEV mode to the EV mode is delayed for a constant time not dependent upon the vehicle speed so that the number of times the engine has started and stopped can be suppressed. This suppresses unstable vehicular behavior so as to make reverse travel easier.

Figure 13:
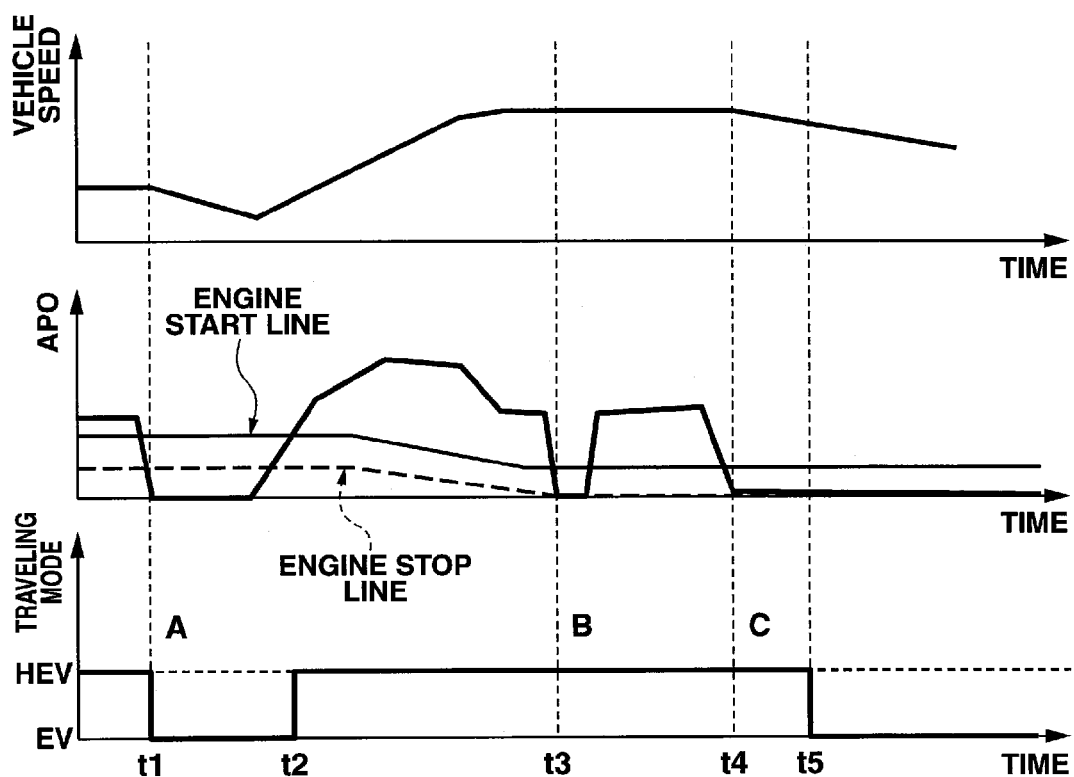
FIG. 13 is a timing chart of a traveling example in which the mode transition control of FIGS. 11 and 12 occurs.

Next explained with reference to FIG. 13 is a mode transition control action in a traveling example. FIG. 13 shows a timing chart representing each characteristic of vehicle speed, accelerator opening angle APO, and traveling mode in the traveling example in which the mode transition control in an embodiment is carried out.

In an area A at time point t1, the vehicle speed is low and the accelerator is in the OFF state. When the accelerator opening angle is reduced and crosses the engine stop line, the mode transition from the HEV mode to the EV mode is immediately effected. Thereafter, since at time point of t2 the accelerator depression operation causes a cross over the engine start line, a mode transition from the EV mode to the HEV mode occurs. In an area B at next time point t3, the vehicle speed is high. Hence, even if the accelerator opening angle is reduced and crosses the engine stop line with the accelerator opening angle in the OFF state, transition to the EV mode is deferred for the calculated delay time. Hence, in a case where the accelerator is depressed while transition to the EV mode is deferred, the HEV mode is continued.

At time point t4, the vehicle speed is high so that the mode transition to the EV mode is deferred for the calculated delay time in area C, even if the accelerator is in the OFF state and the accelerator opening angle is reduced and crosses the engine stop line. When time point t5 is reached and the accelerator remains in the OFF state, the mode transition to the EV mode is carried out after the passage of the calculated delay time (i.e., the time between t4 and t5).

That is, even if the accelerator moves to the OFF state such that the accelerator opening angle is reduced and crosses the engine stop line as in area B at time point t3, the mode transition to the EV mode is deferred for the calculated delay time since the vehicle speed is high. Here, while the mode transition to the EV mode is deferred, the accelerator is depressed. Since the HEV mode is continued in this case, hunting of the engine start-and-stop can be prevented.

In addition, in a case where the accelerator is in the OFF state so that the accelerator opening angle is reduced and crosses the engine stop line as in area A at time point t1, the vehicle speed is low so that the immediate transition from the HEV mode to the EV mode is carried out. Therefore, the regeneration at the time of deceleration due to the accelerator OFF state causes an effective increase in battery SOC of battery 9 to increase the amount of time in the EV mode and to improve the fuel consumption.

The apparatus for controlling the hybrid vehicle in certain embodiments can achieve the following effects listed below.

The apparatus for controlling the hybrid vehicle in an embodiment comprises an engine 1, a motor-generator 2 disposed in a drive system (the power train) from the engine 1 to driving wheels (tire wheels 7, 7) to perform a start of the engine 1 and a drive for the driving wheels according to a motor acceleration and a power generation according to a regeneration driven by the driving wheels, mode switching means (such as first clutch 4) disposed in a linkage section between the engine 1 and motor-generator 2 for switching between a hybrid vehicle mode (HEV mode), in which the hybrid vehicle is powered by both of motor 1 and the motor-generator 2, and an electric vehicle mode (EV mode), in which the hybrid vehicle is powered by the motor-generator 2, and mode transition control means (shown in FIG. 9) for delaying a time from a time at which an engine stop allowance condition is established to a time at which the mode transition is initiated in a high vehicle speed area than another vehicle speed area, when a mode transition from the HEV mode to the EV mode is effected. Therefore, during traveling along with mode transitions, compatibility between the prevention of hunting of the engine start and stop and improvement of fuel consumption can be achieved.

The mode transition control means sets one of a vehicle speed equal to or higher than a vehicle speed at which a constant vehicle speed run can be made in the EV mode or a vehicle speed equal to or higher than another vehicle speed at which constant acceleration can be made from the constant vehicle speed run in the EV mode as a vehicle speed threshold value. The delay time from the time at which the engine stop allowance condition is established to the time at which the mode transition is initiated to be longer as the vehicle speed becomes higher in the vehicle speed region equal to or higher than the vehicle speed threshold value (see FIGS. 11 and 12).

As a result, during the traveling in the HEV mode hunting of the engine start-and-stop can positively be prevented.

The mode transition control means sets the vehicle speed threshold value to be directed toward the lower vehicle speed side as the battery charge capacity (battery SOC) becomes lowered (see FIG. 5).

Therefore, hunting of the engine start and stop can be prevented even if the battery SOC is lowered.

The mode transition control means delays the time from the time at which the engine stop allowance condition is established to the time at which the mode transition is initiated in the whole vehicle speed area (that is, over an entire range of vehicle speeds) when the mode transition from the HEV mode to the EV mode is effected during the selection of the reverse run range (R range). This is seen in FIG. 9 by the transition from step S10→step S11.

Therefore, during reverse (speed) traveling, vehicular behavior is suppressed from being unstable so that a reverse run characteristic can be improved.

The mode transition control means assumes the time from the time at which the engine stop allowance condition is established to the time at which the mode transition is initiated is the delay time set in accordance with the vehicle speed. If a timer activated upon the establishment of the engine stop allowance condition becomes equal to or longer than the set delay time, the mode transition control means initiates mode transition from the HEV mode to the EV mode as described in steps S11 and S12 of FIG. 9. Therefore, in addition to the effects described above, the delay time from the establishment of the engine stop allowance condition to the initiation of the mode transition from the HEV mode to the EV mode can accurately and precisely be controlled.

As described hereinabove, the apparatus for controlling the hybrid vehicle according to the present invention has been described on the basis of certain embodiments. However, a specific structure is not limited to these embodiments.

For example, second clutch CL2 is selected from frictional elements built in stepwise type automatic transmission AT as described herein. However, second clutch 2 may be installed separately from automatic transmission AT. Second clutch CL2 may be installed between the motor-generator MG and the transmission input shaft or second clutch CL2 may be installed between the transmission output shaft and the driving wheels such that second clutch CL2 is separate from automatic transmission AT.

The time from the time at which the engine stop allowance condition is established to the time at which the mode transition is initiated is set herein to a delay time set in accordance with the vehicle speed. However, the time for delaying transition to the EV mode can be set by moving the engine stop line such that its value is smaller than that of the former engine stop line.

As described herein, first clutch 4 is used as the mode switching means for switching the mode between the HEV mode and the EV mode. However, the mode switching means for switching the mode between the HEV mode and the EV mode may be, for example, a planetary gear or a differential unit or power split device that exhibits a clutch function without use of the clutch.

The apparatus for controlling a hybrid vehicle herein is applied to a rear wheel drive-type hybrid vehicle. However, embodiments of the invention can be applied to a front wheel drive-type hybrid vehicle. In fact, the present invention can be applied to any hybrid vehicle having the HEV mode and the EV mode as traveling modes.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for controlling a hybrid vehicle, comprising:
    an engine;
    a vehicle speed sensor configured to detect a vehicle speed of the hybrid vehicle;
    an accelerator pedal sensor configured to detect an opening degree of an accelerator pedal;
    a motor-generator disposed in a drive system extending from the engine to a driving wheel for performing an engine start and a drive for the driving wheel according to a motor acceleration and a power generation according to a regeneration driven by the driving wheel;
    a mode switching device disposed in a linkage section between the engine and the motor-generator for switching between a hybrid vehicle mode, in which the hybrid vehicle is powered by both of the engine and the motor-generator, and an electric vehicle mode, in which the hybrid vehicle is powered by the motor-generator; and
    mode transition control means for implementing a delay time from a time at which an engine stop allowing an accelerator opening is confirmed based on the detected vehicle speed and the detected opening degree of the accelerator pedal to a time at which a mode transition from the hybrid vehicle mode to the electric vehicle mode is initiated in a high vehicle speed area that is higher than a delay time in another vehicle speed area, the vehicle traveling in the high vehicle speed area when it is traveling at or above a vehicle speed threshold level,
    wherein the mode transition control means sets a vehicle speed threshold value as a vehicle speed equal to or higher than a vehicle speed at which, in the electric vehicle mode, a constant speed run can be made, or as a vehicle speed equal to or higher than another vehicle speed at which a constant acceleration from the constant speed run can be made;
    wherein the high vehicle speed area is equal to or higher than the vehicle speed threshold value; and
    wherein the delay time is longer as the vehicle speed becomes higher in the high vehicle speed area.

2. The apparatus of claim 1, wherein the mode transition control means sets the vehicle speed threshold value lower as a battery charge capacity becomes lowered.

3. The apparatus of claim 1, wherein the mode transition control means sets a same delay time in all vehicle speed areas when the vehicle is in a reverse run range.

4. The apparatus of claim 1, wherein the mode transition control means initiates the mode transition from the hybrid vehicle mode to the electric vehicle mode if a timer activated upon establishment of the engine stop allowance condition becomes equal to or longer than the delay time.

5. The apparatus of claim 1, wherein the engine stop allowance condition is established when an accelerator opening angle is equal to or below a predetermined value.

6. The apparatus of claim 5, wherein the predetermined value becomes smaller as the vehicle speed becomes higher.

7. The apparatus of claim 1, wherein the delay time in the another vehicle speed area is set to zero.

8. A method for controlling a hybrid vehicle, the hybrid vehicle including an engine, a motor-generator disposed between the engine and a driving wheel for starting the engine and generating electricity by regenerative operation driven by the driving wheel, a vehicle speed sensor configured to detect a vehicle speed and an accelerator pedal sensor configured to detect an opening degree of an accelerator pedal, the method comprising:
   controlling via a controller a selection between a hybrid drive mode, in which the hybrid vehicle is powered by driving force of both the engine and the motor-generator and an electric drive mode, in which the hybrid vehicle is powered only by the motor-generator;
   enabling via the controller a mode switching from the hybrid drive mode to the electric drive mode based on a vehicle operating state;
   setting via the controller a delay time for timing initiation of the mode switching, the delay time from a time at which an engine stop allowing an accelerator opening is confirmed based on the detected vehicle speed and the detected opening degree of the accelerator pedal to a time at which a mode transition from the hybrid vehicle mode to the electric vehicle mode is initiated in a high vehicle speed area that is higher than a delay time in another vehicle speed area, the vehicle traveling in the high vehicle speed area when it is traveling at or above a vehicle speed threshold level, wherein the vehicle speed threshold value is a vehicle speed equal to or higher than a vehicle speed at which, in the electric vehicle mode, a constant speed run can be made, or as a vehicle speed equal to or higher than another vehicle speed at which a constant acceleration from the constant speed run can be made; and
   initiating via the controller the mode switching after the delay time has expired from a moment when the mode switching has been enabled.

9. The method of claim 8, further comprising:
   increasing via the controller the delay time as the vehicle speed increases over the vehicle speed threshold value.

10. The method of claim 9, further comprising:
   initiating via the controller the mode switching immediately upon detection that the vehicle speed is below the vehicle speed threshold value and the mode switching has been enabled.

* * * * *